Oct. 28, 1952 W. S. ERWIN 2,615,960

VARIABLE CAPACITANCE DEVICE

Filed Nov. 4, 1946

Inventor
Wesley S. Erwin

By Spencer, Willits, Helwig & Baillio
Attorneys

Patented Oct. 28, 1952

2,615,960

UNITED STATES PATENT OFFICE 2,615,960

VARIABLE CAPACITANCE DEVICE

Wesley S. Erwin, Detroit, Mich., assignor to General Motors Corporation, Detroit, Mich., a corporation of Delaware Application November 4, 1946, Serial No. 707,736

11 Claims. (Cl. 175—183)

The present invention relates to a device for indicating visually or audibly capacitance values.

More specifically the invention relates to capacity measuring devices and phonographic pickups using an electronic oscillator and varying the electric characteristics of the tuned circuits of this oscillator by reflected impedance from a circuit containing a variable capacitance.

Previously, phonographic pickups and capacity measuring devices have used bridge circuits and other means of varying the input or control grid signal to an electronic amplifier or oscillator. Some of the previously used phonographic pickups vary a reactance in the plate resonant circuit of an oscillator to get a frequency modulated signal.

Another phonographic pickup used prior to this invention varies the Q-value of the resonant circuit of an oscillator by loading this circuit with a movable vane having low reluctance.

In the present invention, two resonant circuits are utilized. The pickup resonant circuit which includes the capacity being varied is preset to a frequency lying along a portion of the frequency response curve of the plate resonant circuit of the oscillator. At this point a small change in the capacity causes a change in the resistance reflected into the circuit and will cause a comparatively large change in the plate circuit direct current.

It is therefore an object of this invention to produce a capacity measuring device which has high sensitivity, simplicity, and accuracy.

It is a further object of this invention to produce a transducer having a low movable mass and high fidelity.

It is a further object of this invention to produce a vibration pickup which is so coupled as to minimize circuit losses.

It is a still further object of this invention to produce a microphone of the capacity type having an impedance matching network coupling the tuned pickup circuit to the resonant plate circuit of an oscillator.

It is a still further object of the present invention to make a phonographic pickup in which small changes in the capacity of the pickup result in comparatively large changes in the impedance of the plate circuit of an oscillator, and to use the change in plate current resulting therefrom, to control an audio system.

Other objects will become apparent as the specification proceeds and upon inspection of the figures of the drawing and will be specifically pointed out in the claims.

Referring to the figures.

Figure 1:
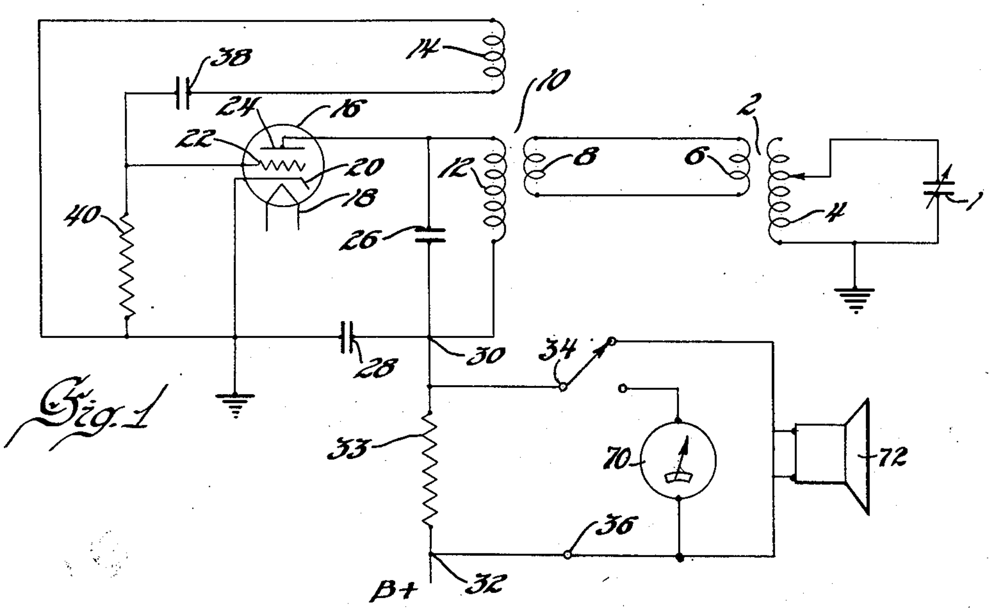
Figure 1 is a circuit diagram of the invention.
Figure 2:
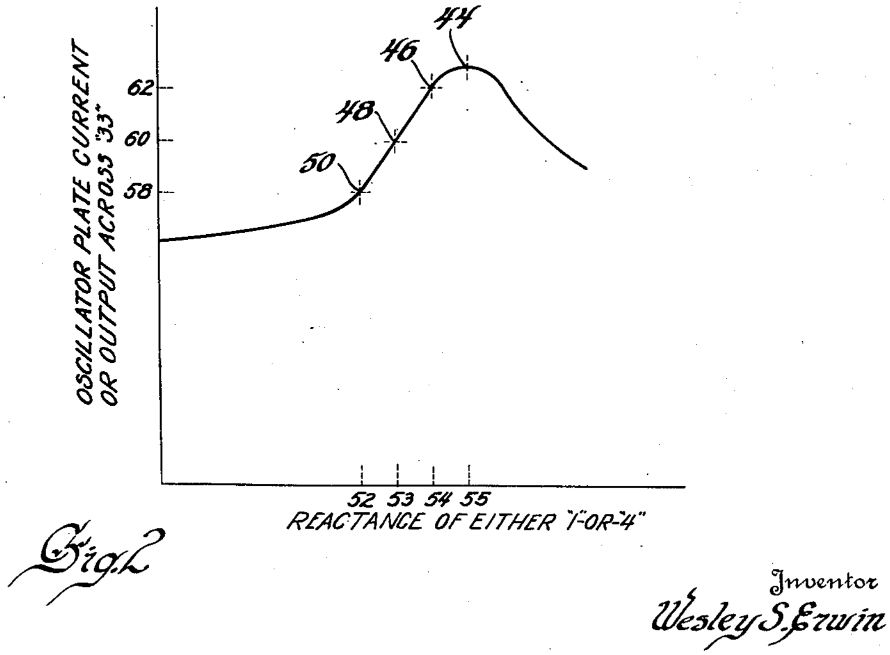
Figure 2 is a curve showing the voltage in the output circuit as plotted against changes in the pickup capacity.

In Figure 1, 1 is a variable condenser which may be a measuring capacity or the capacity pickup in a phonograph head. 2 is a transformer having a high inductance winding 4 which cooperates with the capacity 1 to produce a tuned or resonant circuit. One terminal of the inductance 4 and one terminal of the condenser 1 are connected to ground. The transformer 2 has a winding 6 which forms a low impedance link coupling circuit with the winding 8 of the transformer 10. This transformer also has high inductance windings 12 and 14 arranged in inductive relationship with each other and with winding 8. 16 is a triode of the indirectly heated cathode type. This triode has a heater 18 which is connected to a source of power not shown. 20 is the cathode, 22 is the control grid and 24 is the plate of this triode. The plate circuit of this tube includes a parallel tuned circuit including condenser 26, and inductance 12 of the transformer 10. 28 is a by-pass condenser which maintains the point 30 at zero radio frequency potential but blocks the flow of audio frequency and direct current to ground. The point 32 is maintained at a fixed high potential. The flow of D. C. and audio frequency current across the resistor 33 sets up a potential across the terminals 34 and 36 and this potential is an indication of the capacity at 1. This relationship is shown in Figure 2.

Referring to the grid circuit of the oscillator; the coil 14 is inductively coupled to the coil 12 and coupled to the grid 22 by means of condenser 38 and resistor 40. A signal between the grid 22 and cathode 20 of the tube is thereby produced in the usual manner to maintain the circuit in oscillation.

It is well-known to radio engineers that a circuit such as that including inductance 12 and capacity 26 has a resistive impedance at resonance equal to $L/RC$ where L is the inductance, C is the capacitance and R is the resistance in the closed circuit. It may thus be seen that if R is increased by any means including that of reflecting resistance into the tuned circuit from a second circuit that the resistive impedance thus mentioned will be decreased. It is also well-known that the change of reactance in one of two coupled circuits will result in a change in the resistance component reflected back into the first circuit.

In order that the resistance component of the plate circuit will vary in one direction only when the value of 1 is varied in one direction, it has been found desirable to preset the measuring tuned circuit including inductance 4 and capacitance 1 at a frequency enough different from that of the oscillator to allow the full variation of 1 without these two circuits becoming resonant at the same frequency. In this way, as the capacity 1 in the load circuit is increased, the impedance of the plate circuit, including inductance 12 and condenser 26, will be decreased, reaching a minimum when the two circuits are resonant at the same frequency. The plate current flowing through the tube 16 varies inversely as a function of the impedance of the plate circuit.

As has been mentioned above, the radio frequency component of this current is by-passed by condenser 28 and the low frequency and D. C. components flow through resistance 33. Thus as may be readily seen the voltage across the resistance 33 varies directly as the function of the capacity 1. Therefore the present invention may be used to measure the change in, or the fixed capacity of 1. This fixed capacity may be determined by the use of a capacity of known value and by substitution determine the difference in capacity between 1 and the standard. When this device is used in this manner the voltage across 33 is a D. C. voltage with no audio frequency components the value of this capacitance may be read on an especially calibrated voltmeter 70 and its frequency of changing value determined audibly by the amplifier and loud speaker combination 72.

It may also be readily seen if 1 is varied at an audio frequency that an audio frequency voltage will be produced across the resistance 33. In this case an amplifier and loud speaker may be coupled to the terminals 34, 36 and the output detected audibly. Thus, if 1 was a capacity type phonograph pickup the present invention could be used as a means of translating the oscillation of this condenser pickup into sound.

Referring to Figure 2, the capacitance-plate current relationship described in the operation of the device above is illustrated. In this figure the graph of oscillator plate current versus capacitance illustrates the change in current through the resistor 33 as the condenser is varied throughout the frequency range. In this figure, 44 is the point of maximum plate current resulting from the two resonant circuits being tuned to the same frequency. At this point a maximum of resistance is reflected back into the plate tuned circuit and the maximum of plate current results. The portion of the curve lying between the point 46 and the point 50 approximates a straight line and is used in the present invention. The preset point about which the invention operates is point 48. It may therefore be seen as the condenser 1 is varied between a capacitance value of 52 and 54 or the inductance 4 is varied between an inductance value of 52 and 54 that the plate current or voltage across resistor 33 will vary between 58 and 62. I have found it convenient to use the point 44 as a reference point to preset the resonant frequency of the tuned circuit 1, 4. For maximum current the capacitance value of the condenser 1 or the inductance value of indicator 4 is 55. By experiment, the amount of change of capacity necessary to set said condenser 1 at a value of 53 is known. This results in a current output of 60. Working from this preset value, any changes in the value of condenser 1 or inductance 4 may be detected either by meter or audio system connected to the terminals 34 and 36.

It is to be understood also that although the invention has been described with specific reference to a particular embodiment thereof, it is not to be so limited, since changes and alterations therein may be made which are within the full intended scope of this invention as defined by the appended claims.

I claim:

1. An electronic device for developing an electrical signal in accordance with the mechanical variation of the relationship between the plates of an electric condenser including: an electronic oscillator having a resonant plate circuit and a grid circuit inductively coupled thereto, a second resonant circuit including a condenser having at least one movable plate coupled to said plate circuit the resonant frequency of said second circuit varied between the resonant frequency of said plate circuit and a frequency slightly different therefrom by the mechanical variation of the relationship between said condenser plates, means for varying said condenser plate relationship, said variation causing changes in the plate current of the oscillator as a result of the change in reflected impedance, and means for detecting the changes in said plate current to thereby indicate directly changes in the mechanical relationship between said condenser plates.

2. In an instrument for measuring capacitance, a tuned plate circuit electronic oscillator, having a grid circuit inductively coupled to the tuned plate circuit of said oscillator, a resonant circuit including an inductance and the capacitance being measured coupled to the tuned plate circuit of said oscillator, said resonant circuit pretuned to a frequency slightly different from that of said tuned plate circuit and reflecting resistance into said plate circuit to cause a change in the plate current thereof, and means in said plate circuit responsive to said plate current capable of indicating directly the value of capacitance being measured.

3. In apparatus for measuring capacity including, an electronic oscillator having a tuned plate circuit, having a grid circuit inductively coupled thereto, and a second tuned circuit coupled thereto, said second tuned circuit capable of having its resonant frequency varied in accordance with the change in the capacitance being measured, said variation in frequency being about a mean frequency slightly different from the resonant frequency of said plate circuit thereby changing the Q-value of said tuned plate circuit to change the plate current of said oscillator, and means for measuring the plate current to thereby directly determine the change in the capacitance being measured.

4. A transducer including: an electronic oscillator having a tuned plate circuit, an electrostatic pick-up the capacity of which may be varied at an audio frequency, an inductance coil connected in parallel thereto and coupled to the tuned circuit of said oscillator, said inductance and said electrostatic pick-up preset to have a natural frequency of oscillation slightly different from that of said tuned plate circuit, an impedance in the plate circuit in said oscillator across which an audio frequency signal voltage is generated by the change in plate current of said oscillator resulting from changes in impedance of said tuned plate circuit due to variations in impedance reflected from said electrostatic pick-up through said coupling.

5. A phonographic device including: an electronic oscillator having a tuned plate circuit, a condenser the capacity of which is varied in accordance with irregularities on the surface of a phonograph recording, an inductance connected in parallel to and forming a resonant circuit with said condenser, said resonant circuit pretuned to a frequency slightly different from the resonant frequency of said plate circuit, said resonant circuit being coupled to said tuned plate circuit, and an impedance in said plate circuit across which an electrical signal is developed due to changes in plate current caused by variations in the impedance reflected from said resonant circuit into said plate circuit due to varying the capacity of said condenser.

6. A phonographic pick-up assembly including an electronic oscillator having a tuned plate circuit, a second tuned circuit coupled thereto, said second circuit capable of having its resonant frequency varied in accordance with irregularities on the surface of a phonographic recording, the variation in frequency of said second circuit being about a mean frequency slightly different from the resonant frequency of said plate circuit, thereby reflecting resistance into said oscillator plate circuit at an audio frequency, and audible means for detecting the variation in plate current caused by the change in reflected resistance.

7. An electronic device for developing an electrical signal in accordance with variation in the mechanical relationship between the plates of an electric condenser including an electronic oscillator having a tuned plate circuit, a second tuned circuit including an inductance and a variable capacitance, means for coupling said tuned plate circuit and said second tuned circuit comprising a link having one winding coupled to said tuned plate circuit and another winding coupled to said second tuned circuit, the resonant frequency of said second circuit being varied slightly from that of said plate circuit upon adjustment of said variable condenser, said variation causing changes in the impedance reflected into said plate circuit, thereby causing changes in the plate current of said oscillator, and means for detecting the changes in said plate current thereby giving a direct indication of the mechanical relationship between the plates of said condenser.

8. An instrument for measuring capacitance directly including an electronic oscillator having a tuned plate circuit, and a grid circuit inductively coupled to said plate circuit, a second tuned circuit having an inductance connected in parallel with a capacitance to be measured, means for inductively coupling said tuned plate circuit and said second tuned circuit comprising a low impedance link having one winding coupled to said tuned plate circuit and a second winding coupled to said second tuned circuit, said last mentioned circuit being pretuned to a frequency slightly different from that of said tuned plate circuit and reflecting resistance into said plate circuit to cause a change in the plate current thereof, and means in said plate circuit responsive to said plate current for indicating directly the value of capacitance being measured.

9. An instrument for measuring capacitance directly including a tuned plate circuit electronic oscillator, a grid circuit inductively coupled to said plate circuit, a second tuned circuit including an inductance and the capacitance being measured, inductively coupled to the said tuned plate circuit and grid circuit, said second tuned circuit being pretuned to a frequency slightly different from that of said tuned plate circuit and reflecting resistance into said plate circuit to cause a change in the plate current thereof, and means in said plate circuit responsive to said plate current for indicating directly the value of capacitance being measured.

10. An apparatus for directly measuring capacity including, an electronic oscillator having a tuned plate circuit, a grid circuit inductively coupled to said plate circuit, a second tuned circuit inductively coupled to said tuned plate circuit, said second circuit including an inductance connected in parallel with the capacitance to be measured and being adapted to have its frequency varied slightly from the resonant frequency of said plate circuit upon change of the said capacitance being measured, thereby changing the Q-value of said tuned plate circuit to change the plate current of said oscillator, and means for measuring the plate current to thereby directly determine the change in the capacitance being measured.

11. An electronic device for developing an electrical signal in accordance with the capacitance in a remote circuit including an electronic oscillator having a resonant plate circuit, a second resonant circuit including an inductance and a capacitance coupled to said resonant plate circuit, the resonant frequency of said second circuit being slightly different from that of said plate circuit, whereby a change in the reactance of said second resonant circuit is reflected as resistance into said plate circuit and thus causes a proportional change in the plate current, and means for detecting said change in the plate current to indicate directly the extent of said change in reactance.

WESLEY S. ERWIN.

REFERENCES CITED

The following references are of record in the file of this patent:

UNITED STATES PATENTS

| Number | Name | Date |
|---|---|---|
| 1,708,073 | Allen | Apr. 9, 1929 |
| 1,754,293 | Weinberger | Apr. 15, 1930 |
| 1,905,332 | Barbulesco | Apr. 25, 1933 |
| 2,018,673 | Howe | Oct. 29, 1935 |
| 2,135,017 | Sharland | Nov. 1, 1938 |
| 2,149,756 | Arenberg et al. | Mar. 7, 1939 |
| 2,230,297 | Inoue | Feb. 4, 1941 |
| 2,411,247 | Cohen | Nov. 19, 1946 |
| 2,439,047 | Grinstead et al. | Apr. 6, 1948 |